UNITED STATES PATENT OFFICE.

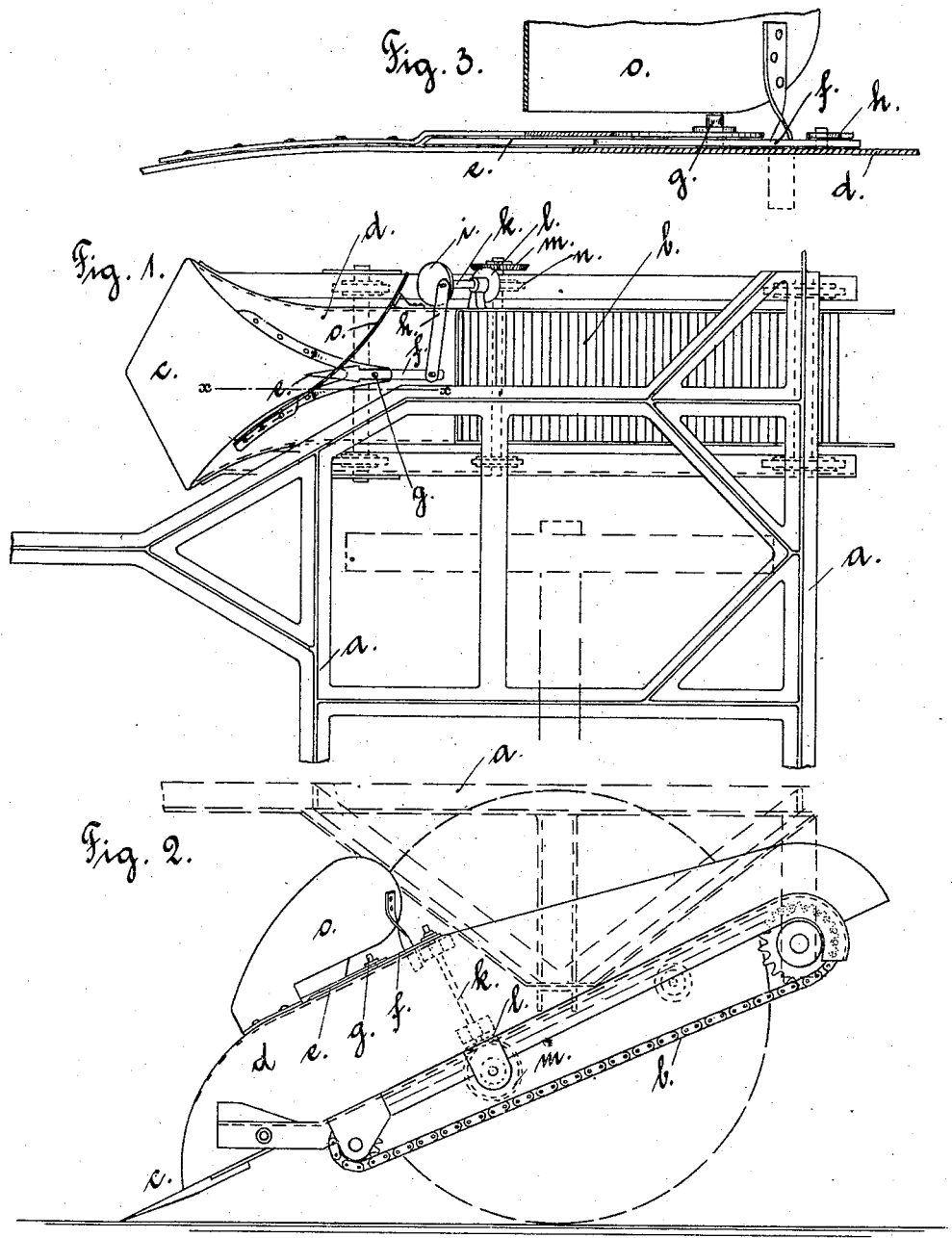

PAUL PLATE, OF SCHLOSS BUDDENBURG, NEAR LÜNEN, GERMANY.

POTATO-HARVESTER.

No. 869,103.      Specification of Letters Patent.      Patented Oct. 22, 1907.

Application filed March 29, 1907. Serial No. 3652,49.

*To all whom it may concern:*

Be it known that I, PAUL PLATE, forester, a subject of the German Emperor, and a resident of Schloss Buddenburg, near Lünen a. d. Lippe, Westfalen, Germany, have invented certain new and useful Improvements in Potato-Harvesters, of which the following is a specification.

This invention relates to potato harvesters and especially to a digging device for such harvesters, the object of the invention being to provide a digging device of this kind wherein means are provided for cutting the vines adhering to the potatoes and for rejecting them sidewards out of the way of travel of the potatoes.

In the annexed drawings in which similar letters of reference designate analogous parts, Figure 1 is a top plan view of a part of a potato harvester including my improved vine cutting and removing device. Fig. 2 is the side elevation view of same the framework and the wheel of the harvester being shown by dotted lines. Fig. 3 shows the device on an enlarged scale, being a sectional view on line $x$—$x$ of Fig. 1, of the vine cutting and removing device.

In the drawings $a$ is the framework of a potato harvester, $b$ the elevator which in the well known manner is terminated at its front by a plow $c$ which penetrates into the earth and receives the earth as well as the potatoes, contained therein. The earth and potatoes arrive from the plow upon the chain of the elevator.

While in the harvesters used until now, it was necessary to remove previously from the field the potato vines, or to carry them through the harvester where they cause many inconveniences, the improved construction of my harvester is such that the potatoes together with the earth and the vines are received by the plow and that the vines are cut away before the potatoes and the earth reach the elevator, the cut vines being rejected towards the side. To this end a tube like member $d$ is inserted between the plow and the elevator so that the digged mass is obliged to pass through it. This tube like member is cut away in its upper part in such a manner that the cut edges form an opening which becomes gradually narrower and pointed towards the rear and opening gradually forwards. Under the rear point of the said cut away portion oscillates the one arm of a double armed lever $ef$ which oscillates on the top of the tube like member $d$ round a fixed pin $g$. This arm has received the shape of a knife $e$ while the the other arm $f$ of the said lever is connected by a connecting rod $h$ with a crank $i$ which is rotated by suitable actuating means, such as for instance shaft $k$, bevel gearing $l$, $m$ and a sprocket wheel $n$ driven from the elevator chain.

Arranged above the knife $e$ is a vertical wall $o$ in such a manner, that it is directed from one side of the opening obliquely rearwards across the knife to the opposite side, as clearly shown in the drawing. This arrangement has for its object to direct sidewards the vines secured from the potatoes by the knife $e$ and to cause them to fall on the earth at the side of the tube $d$ and of the harvester.

Having now fully described my said invention what I claim and desire to secure by Letters Patent is:

1. In a potato harvester the combination with the framework, the digging plow and the elevator, of a tube like structure arranged above the digging plow between the latter and the elevator, a cut away portion in the front part of the upper wall of the said tube like structure, the said cut away part becoming narrower rearwards, a cutting device arranged over the rear apex of the said cut away portion, means for actuating the said cutting device and means for causing the cut away vines of the potatoes to move sidewards and to fall at the side of the harvester substantially as and for the purpose set forth.

2. In a potato harvester the combination with the framework, the digging plow and the elevator of a tube like structure having a rectangular section and arranged above the plane of and between the digging plow and the elevator, the front part of the upper wall of the said tube like structure being cut away so as to form an angularly shaped entrance having its apex at the rear, a double armed lever fulcrumed on the said upper wall of the tube like structure and having its front arm in the form of a knife and arranged over the said rear apex of the said entrance opening, a connecting rod pivotally connecting the rear arm of the said lever with a rotating crank, means for actuating the said crank from the elevator chain and means for causing the cut away vines of the potatoes to be deflected sidewards, substantially as and for the purpose set forth.

3. In a potato harvester the combination with the framework, the digging plow and the elevator of a tube like structure arranged above the plane of and between the digging plow and the elevator and having a rearwardly tapering entrance opening cut away in the front part of its upper wall, an oscillating cutting device adapted to cut the potato vines, means for actuating the cutting device and a substantially vertical wall mounted on the said upper wall of the tube like structure so as to start from one (the inside) edge of the entrance opening and to direct itself obliquely rearwards across and above the said cutting device towards the outside of the said tube like structure, substantially as and for the purpose set forth.

In testimony whereof I have hereunto set my hand in presence of two witnesses.

PAUL PLATE. [L. S.]

Witnesses:
    VON POSECK,
    F. RÜHENBERK.